(No Model.)

W. S. MALLARD.
FISH POND TRUNK.

No. 325,552. Patented Sept. 1, 1885.

WITNESSES:
Fred. G. Dieterich
John C. Kennon

INVENTOR:
W. S. Mallard
BY Munn & Co
ATTORNEYS.

UNITED STATES PATENT OFFICE.

WILLIAM S. MALLARD, OF DARIEN, GEORGIA.

FISH-POND TRUNK.

SPECIFICATION forming part of Letters Patent No. 325,552, dated September 1, 1885.

Application filed April 8, 1885. (No model.)

*To all whom it may concern:*

Be it known that I, WILLIAM S. MALLARD, of Darien, McIntosh county, Georgia, have invented a new and Improved Fish-Pond Trunk; and I do hereby declare the following to be a full, clear, and exact description of the same, reference being had to the accompanying drawings, forming a part of this specification, in which—

Figure 1:
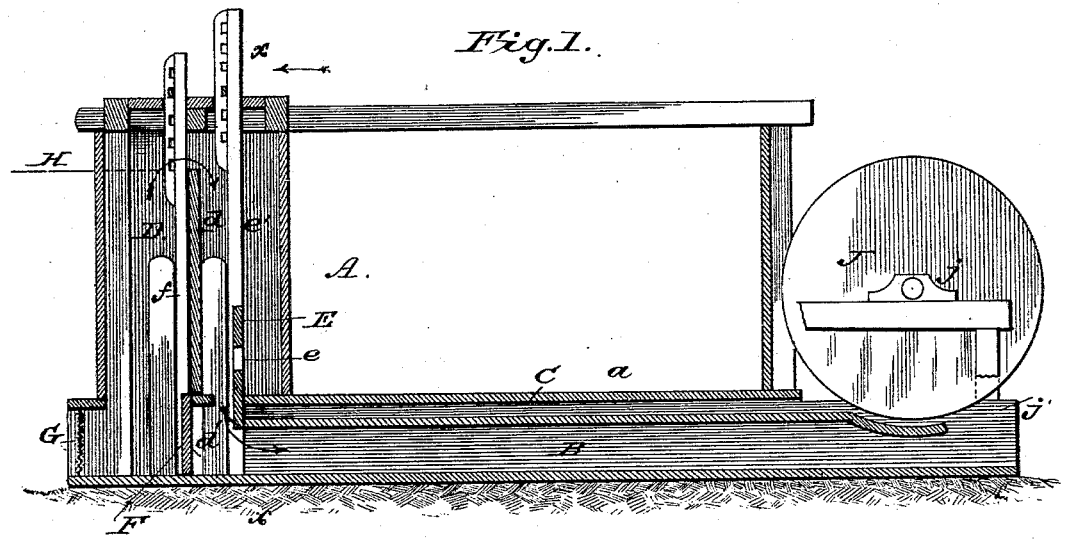
Figure 2:
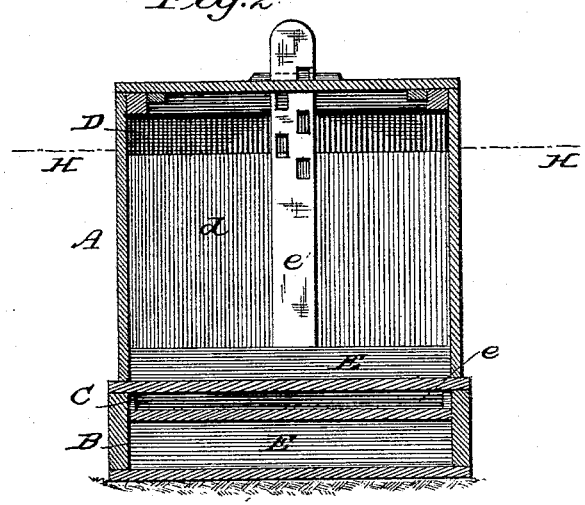

Figure 1 is a cross-section through a portion of the dam inclosing a fish-pond, and shows the construction of the trunk. Fig. 2 is a cross-section through the transfer-gate chamber, taken on the line $x\ x$ in Fig. 1.

This invention relates to trunks used in connection with fish-ponds for regulating and utilizing the flow of water and for preventing the escape of fish.

This invention consists in the combination of the parts hereinafter described, by which a water-wheel may be operated by the overflow water of the pond, or the overflow water may be allowed to pass off without operating the water-wheel, or the whole of the water in the pond may be utilized for driving the said water-wheel, or may be allowed to pass off and empty the pond without turning it. In whichever way the water is allowed to pass off, the escape of fish from the pond is prevented.

In the accompanying drawings similar letters of reference indicate corresponding parts in all the figures.

A is the cross-section of the dam of a fish-pond, the top $a$ of which may be used for a carriage-road, if desired.

B is a passage in the lower part of the dam for letting the water out of the fish-pond.

C is another passage in the lower part of the dam for conducting the water let out from the fish-pond to the undershot water-wheel J.

H represents the level of the water in the fish-pond. G is a grating which covers the opening between the pond and the chamber D, in which are situated the gates which control the flow of water from the pond into the passages B and C. The grating G prevents the escape of fish from the pond, and is so constructed that it may be removed, if necessary.

The undershot water-wheel J is of ordinary construction, and runs in bearings $j$, attached to the side frames, $j'$, which prevent the escape of the water past the sides of the wheel.

The chamber D is provided with a partition, $d$, which extends upward to about the usual level of the water in the pond, and an opening, $d'$, is provided in the lower part of the partition $d$ for the direct passage of water from the pond to passages B and C.

E is the transfer-gate, provided with an opening, $e$, in it, and a long shaft, $e'$, extending upward through an opening in the top of the chamber D, by which it may be raised or lowered.

F is the low-water gate, which works in connection with the opening $d'$ in the partition $d$, and is provided with the long shaft $f$, extending upward through an opening in the top of the chamber D, by which it may be raised or lowered.

The combined action of the various parts above described is as follows: When the gates are arranged as shown in the drawings, the overflow water of the pond passes over the top of partition $d$, in the direction of the arrows, and passes off down the passage B. If the transfer-gate E should be lowered so as to cover the end of passage B, the overflow water will pass through the opening $e$ in the said gate down passage C, and will drive the water-wheel J. Should the water in the pond be lower than the top of partition $d$ the low-water gate can be opened. The water from the pond will then pass directly to the transfer-gate E. If this is lowered, the water will pass down passage C and drive the water-wheel J. If the gate E is raised so as to close the passage C, the water will run off down passage B and empty the pond. The grating G at all times operates to prevent the escape of fish from the pond, however the gates E and F may be arranged to act.

Having thus described my invention, what I claim as new, and desire to secure by Letters Patent, is—

1. In a fish-pond trunk, the combination, with the dam, of the passages B and C, a water-wheel, transfer-gate E, and chamber D, provided with the partition $d$, substantially as described and shown, and for the purpose set forth.

2. In a fish-pond trunk, the combination, with the dam, of the passages B and C, a water-wheel, transfer-gate E, chamber D, provided with the partition $d$, having the opening $d'$ therein, and the low-water gate F, substantially as described and shown, and for the purpose set forth.

3. The combination, in a fish-pond trunk, of the grating G, with the chamber D, having partition $d$, the transfer-gate E, and passages B and C, substantially as described and shown.

4. The combination, in a fish-pond trunk, of the grating G, the chamber D, provided with partition $d$, having opening $d'$ therein, low-water gate F, passages B and C extending through the lower part of the dam, and the transfer-gate E, substantially as described and shown.

WILLIAM S. MALLARD.

Witnesses:
JAMES WALKER,
L. M. BEALER.